United States Patent
Smith et al.

(10) Patent No.: US 10,215,072 B2
(45) Date of Patent: Feb. 26, 2019

(54) METHODS FOR CONTROLLING AND DETECTING CATALYST POISONING OF SELECTIVE CATALYTIC REDUCTION DEVICES

(71) Applicant: GM GLOBAL TECHNOLOGY OPERATIONS LLC, Detroit, MI (US)

(72) Inventors: Michael A. Smith, Clarkston, MI (US); Praveen S. Chavannavar, Milford, MI (US); Po-I Lee, Rochester Hills, MI (US); Sarah Funk, Canton, MI (US); Thomas LaRose, Jr., Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 15/467,312

(22) Filed: Mar. 23, 2017

(65) Prior Publication Data
US 2018/0274421 A1 Sep. 27, 2018

(51) Int. Cl.
*F01N 3/20* (2006.01)
*F01N 9/00* (2006.01)
*F01N 3/021* (2006.01)

(52) U.S. Cl.
CPC ........... *F01N 3/2066* (2013.01); *F01N 3/021* (2013.01); *F01N 3/2013* (2013.01); *F01N 9/00* (2013.01); *F01N 2260/04* (2013.01); *F01N 2570/00* (2013.01); *F01N 2610/02* (2013.01); *F01N 2900/1602* (2013.01); *F01N 2900/1622* (2013.01); *Y02T 10/24* (2013.01); *Y02T 10/26* (2013.01); *Y02T 10/47* (2013.01)

(58) Field of Classification Search
USPC .......... 60/274, 276, 277, 286, 295, 297, 301
See application file for complete search history.

(56) References Cited

U.S. PATENT DOCUMENTS

| | | | |
|---|---|---|---|
| 8,596,042 B2 * | 12/2013 | Parmentier | F01N 3/208 60/275 |
| 2011/0041481 A1 * | 2/2011 | Fujita | B01D 53/9431 60/287 |

(Continued)

*Primary Examiner* — Binh Q Tran

(57) ABSTRACT

Method for controlling and detecting ammonium nitrate and/or ammonium nitrite poisoning within selective catalytic reduction (SCR) devices and systems incorporating the same are provided. Methods can include detecting a SCR inlet exhaust gas $NO_2:NO_x$ ratio above a poisoning NOx flux threshold, detecting a SCR temperature below a poisoning temperature threshold, and determining SCR catalyst poisoning. Methods can further include performing a SCR catalyst cleaning strategy, wherein the SCR cleaning strategy comprises heating the SCR catalyst composition to a temperature above the poisoning temperature threshold. Cleaning strategies can including utilizing a heater, implementing a post-injection, after-injection, and/or auxiliary injection engine strategy wherein the engine is configured to supply exhaust gas to the SCR. Methods can further include arresting reductant dosing, identifying an opportunistic regeneration opportunity, and/or inhibiting performance of an appurtenant oxidation catalyst subsequent to determining SCR catalyst poisoning. The SCR catalyst composition can comprise iron and/or copper.

12 Claims, 2 Drawing Sheets

(56) References Cited

U.S. PATENT DOCUMENTS

2012/0055138 A1* 3/2012 Sloane ............... B01D 53/9409
                                                           60/274
2012/0117954 A1* 5/2012 Yasui ....................... F01N 3/208
                                                           60/301
2013/0064717 A1* 3/2013 Masaki ................... F01N 3/208
                                                           422/108
2015/0096287 A1* 4/2015 Qi ........................... F01N 3/208
                                                           60/286

* cited by examiner

METHODS FOR CONTROLLING AND DETECTING CATALYST POISONING OF SELECTIVE CATALYTIC REDUCTION DEVICES

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur ($SO_x$), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR. The ammonia then reduces the $NO_x$ to nitrogen and water in the presence of the SCR catalyst. Ensuring a suitable reduction of $NO_x$ species via a SCR over a variety of operating conditions remains a challenge.

SUMMARY

One or more embodiments provide methods for detecting catalyst poisoning of a selective catalytic reduction device (SCR), wherein the SCR includes a catalytic composition configured to receive reductant and exhaust gas. The SCR catalytic composition can include one or more of copper and iron. In particular, the SCR catalytic composition can include one or more of a copper-impregnated zeolite and an iron-impregnated zeolite. The methods can include detecting a SCR inlet exhaust gas NO2:NOx ratio above a poisoning NOx flux threshold, detecting a SCR temperature below a poisoning temperature threshold, and determining SCR catalyst poisoning. The poisoning flux threshold can be a NO2:NOx ratio of about 0.45. The poisoning temperature threshold can be about 275° C. SCR catalyst poisoning can include one or more ammonium nitrites and ammonium nitrates forming and/or accumulating proximate the SCR catalytic composition. The methods can further include determining a minimum SCR reductant loading prior to determining SCR catalyst poisoning. Determining SCR catalyst poisoning can include one or more of measuring an amount of accumulated ammonium nitrites and/or ammonium nitrates deposit proximate the SCR catalyst, and measuring a decreased reduction yield of NOx species by the SCR catalyst.

One or more embodiments provide methods for controlling an exhaust gas treatment system, wherein the exhaust gas treatment system can include a selective catalytic reduction device (SCR) configured to receive exhaust gas supplied by an internal combustion engine (ICE) and reductant. The SCR catalytic composition can include one or more of copper and iron. In particular, the SCR catalytic composition can comprise one or more of a copper-impregnated zeolite and an iron-impregnated zeolite. The methods can include detecting an SCR inlet exhaust gas NO2:NOx ratio above a poisoning NOx flux threshold, detecting a SCR temperature below a poisoning temperature threshold, determining SCR catalyst poisoning, and performing a SCR catalyst cleaning strategy, wherein the SCR cleaning strategy comprises heating the SCR catalyst composition to a temperature above the poisoning temperature threshold.

The poisoning flux threshold can be a NO2:NOx ratio of about 0.45. The poisoning temperature threshold can be about 275° C. SCR catalyst poisoning can include one or more ammonium nitrites and ammonium nitrates forming and/or accumulating proximate the SCR catalytic composition. The method further include determining a minimum SCR reductant loading prior to determining SCR catalyst poisoning. The method can further include arresting reductant dosing subsequent to determining SCR catalyst poisoning. The exhaust gas treatment system can further include an oxidation catalyst device disposed upstream from the SCR, and the method can further include comprising inhibiting the oxidation catalyst device performance subsequent to determining SCR catalyst poisoning. Inhibiting oxidation catalyst performance can include implementing an ICE rich burn strategy. A cleaning strategy can include one or more of utilizing an electric heater device disposed proximate the SCR catalyst composition, adjusting ICE calibration parameters to implement a post-injection strategy, adjusting ICE calibration parameters to implement an after-injection strategy, or implementing an auxiliary injection strategy. The methods can further include identifying a cooperative regeneration opportunity prior to performing a SCR catalyst cleaning strategy. The exhaust gas treatment system can further include a particulate filter device, and the SCR catalyst cleaning strategy can include a particulate filter device regeneration.

Other objects, advantages and novel features of the exemplary embodiments will become more apparent from the following detailed description of exemplary embodiments and the accompanying drawings.

DETAILED DESCRIPTION

Figure 1:
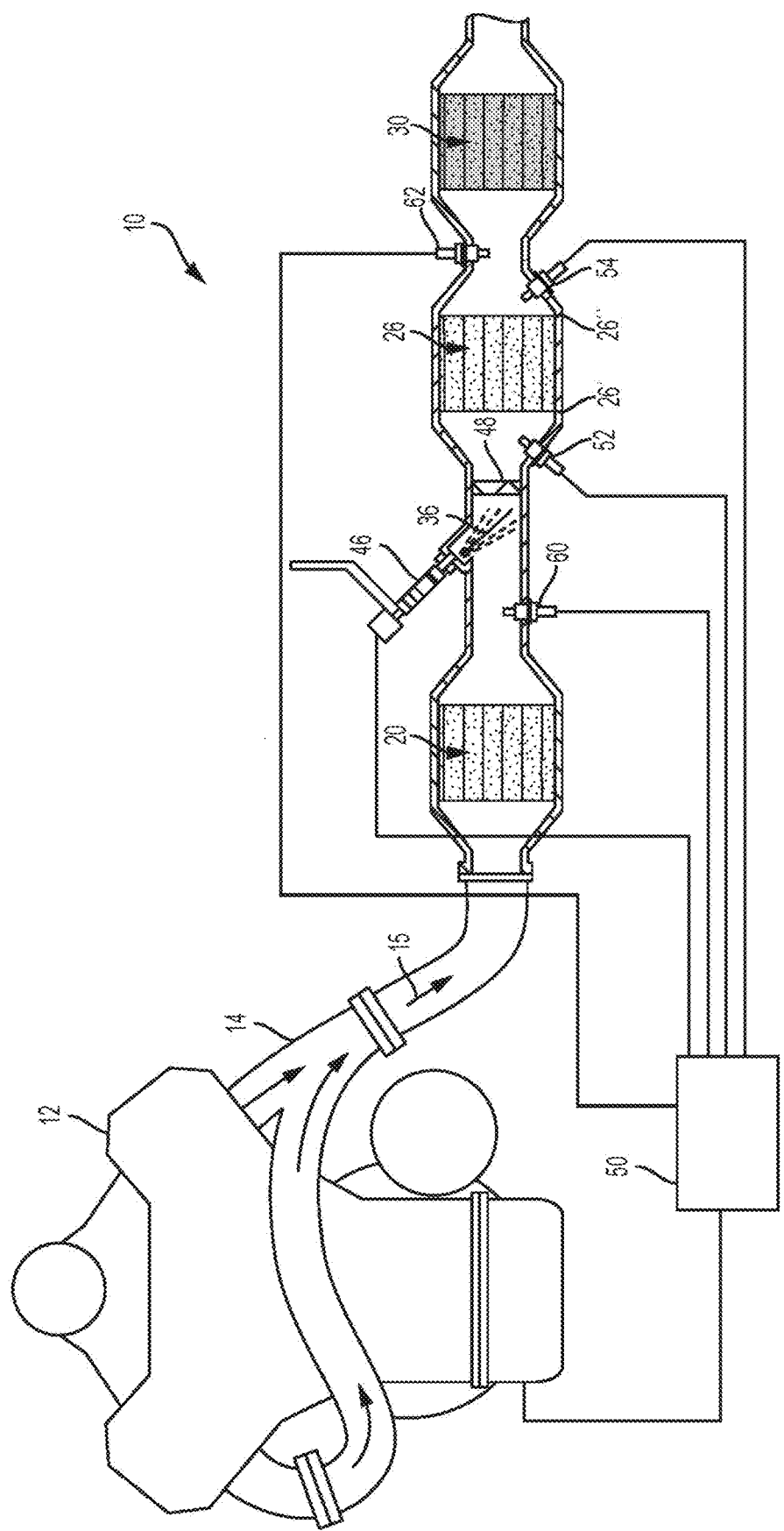
FIG. 1 illustrates an schematic view of an exhaust gas treatment system, according to one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure pertains to the control and monitoring of $NO_x$ storage and/or treatment materials, devices, and systems. In particular, this disclosure provides methods for controlling selective catalytic reduction devices (SCR), wherein the SCRs are configured to receive exhaust gas streams from an exhaust gas source. SCRs are further configured to receive reductant, such as at variable dosing rates as will be described below. Provided herein are methods for monitoring the formation of SCR-poisoning species, and the mitigation thereof. SCR-poisoning species can include ammonia nitrates (e.g., $NH_4NO_3$) and ammonia nitrites (e.g., $NH_4NO_2$), among others. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$.

In some embodiments, the exhaust gas source generating the exhaust gas streams can be an internal combustion engine (ICE). Methods described herein are germane to ICE systems that can include, but are not limited to, diesel engine systems, gasoline direct injection systems, and homogeneous charge compression ignition engine systems. An ICE can include a plurality of reciprocating pistons attached to a crankshaft which may be operably attached to a driveline, such as a vehicle driveline, to power a vehicle (e.g., deliver tractive torque to the driveline). For example, an ICE can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore when reference is made to a vehicle, such disclosure should be interpreted as applicable to any application of an ICE.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., carbonaceous solids). It should be further understood that the embodiments disclosed herein may be applicable to treatment of effluent streams not comprising carbonaceous and/or particulate matter species, and, in such instances, ICE can also generally represent any device capable of generating an effluent stream comprising such species. Exhaust gas particulate matter generally includes carbonaceous soot, and other solid and/or liquid carbon-containing species which are germane to ICE exhaust gas or form within an exhaust gas treatment system.

FIG. 1 illustrates an exhaust gas treatment system 10 for treating and/or monitoring the exhaust gas 15 constituents of an ICE 12. System 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In embodiment as illustrated, system 10 comprises SCR 26. In general, SCR 26 includes all devices which utilize a reductant 36 and a catalyst to NO and $NO_2$ to harmless components. Upstream and downstream are defined in relation to the direction of the flow of exhaust gas 15 from ICE 12. As shown in FIG. 1, SCR 26 includes an upstream side 26' and a downstream side 26". SCR 26 is configured to receive reductant, such as at variable dosing rates. Reductant 36 can be supplied from a reductant supply source (not shown) and injected into the exhaust gas conduit 14 at a location upstream of the SCR 26 using an injector 46, or other suitable method of delivery. Reductant 36 can be in the form of a gas, a liquid, or an aqueous solution, such as an aqueous urea solution. Reductant 36 can be mixed with air in the injector 46 to aid in the dispersion of the injected spray. A turbulator 48 (i.e., mixer) can also be disposed within the exhaust conduit 14 in close proximity to the injector 46 and/or the SCR 26 to further assist in thorough mixing of reductant 36 with the exhaust gas 15 and/or even distribution throughout the SCR 26.

System 10 can optionally further include oxidation catalyst device (OC) 20, and particulate filter device (PF) 30. OC 20 includes one or more catalytic compositions, such as one or more platinum group metals including platinum (Pt), palladium (Pd), rhodium (Rh) or other metal oxide catalysts such as perovksites, ruthenium (Ru), osmium (Os), iridium (Ir), or combinations thereof. Optional OC 20 can include, for example, a flow-through metal or ceramic monolith substrate that can be packaged in a stainless steel shell or canister having an inlet and an outlet in fluid communication with exhaust gas conduit 14. The OC catalytic compound can be disposed one more or more of the substrate and canister. The oxidation catalyst compound can be applied to the substrate and/or canister as a wash coat, in some embodiments.

OC 20 can be utilized to oxidize $NO_x$ and other species present in exhaust gas 15. In some embodiments an OC, such as a diesel oxidation catalyst device (DOC), can be positioned upstream from SCR 26 to convert NO into $NO_2$ for preferential treatment in SCR 26. Accordingly, during normal operation of OC 20, exhaust gas 15 upstream of OC 20 will have a lower $NO_2$:NO ratio than exhaust gas 15 downstream of OC 20. Similarly, during normal operation of OC 20 (i.e., at or above the light-off temperature) exhaust gas 15 downstream of OC 20 will have a $NO_2$:Total NOx ratio of at least about 0.3, at least about 0.4, at least about 0.5, or at least about 0.6, for example. As used herein, ratios of one or more compounds represent molar ratios. OC 20 can optionally additionally or alternatively convert various regulated exhaust constituents to other regulated or unregulated exhaust constituents through oxidation. For example, OC 20 can be configured to oxidize hydrocarbons (HC) to carbon dioxide $CO_2$ and water ($H_2O$), convert carbon monoxide (CO) to carbon dioxide ($CO_2$), and convert sulfur dioxide ($SO_2$) to sulfur trioxide ($SO_3$) and/or sulfuric acid ($H_2SO_4$). Other optional oxidations are contemplated as well, including oxidation of aldehydes, polycyclic aromatic hydrocarbons, or non-volatile unburned hydrocarbons.

When combustible species, particularly hydrocarbon species, are present within OC 20, oxidation can comprise combustion. Further, the reactions in OC 20 can be used to reduce the odor of certain emission components.

Optional PF 30 can be disposed downstream of SCR 26, as shown, or can be disposed upstream of SCR 26. For example only, PF 30 can include a diesel particulate filter (DPF). PF 30 operates to filter the exhaust gas 15 of carbon, soot, and other particulates. PF 30 generally includes a filter, such as a ceramic or SiC wall flow monolith filter, packaged in a shell or canister. The canister can be constructed of, for example, stainless steel, and have an inlet and an outlet in fluid communication with exhaust gas conduit 14. In some embodiments, exhaust treatment system 10 can further include a selective catalytic reduction filter device (SCRF). In some embodiments, exhaust treatment system 10 can include a SCRF as an alternative to a SCR 26 and PF 30. SCRFs generally provide the catalytic aspects of SCRs in addition to particulate filtering capabilities of PFs. For example, a SCRF can include a filter carrier or substrate that is dipped into a washcoat containing a SCR catalytic component.

System 10 can further include a control module 50 operably connected via a number of sensors to monitor ICE 12 and/or the exhaust gas treatment system 10. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to ICE 12, SCR 26, and/or one or more sensors. As shown, control module 50 is in communication upstream $NO_x$ sensor 60 and downstream $NO_x$ sensor 62, disposed downstream of SCR 26, each of which are in fluid communication with exhaust gas conduit 14. Upstream NOx sensor 60 is disposed downstream of the ICE 12 and upstream of SCR 26 and turbulator 48. Upstream $NO_x$ sensor 60 and downstream $NO_x$ sensor 62 are configured to detect a $NO_x$ level proximate their location within exhaust gas conduit 14, and generate a $NO_x$ signal which corresponds to the $NO_x$ level. A NOx level can comprise a concentration, a mass flow rate, or a volumetric flow rate, in some embodiments. A NOx signal generated by a NOx sensor can be interpreted by control module 50, for example. Control module 50 can optionally be in communication one or more temperature sensors, such as upstream temperature sensor 52, disposed upstream from SCR 26, and downstream temperature sensor 54, disposed downstream of SCR 26. One or more temperature sensors may additionally or alternatively be disposed to directly measure temperature of the SCR 26 and/or OC 20 catalytic compositions.

The SCR 26 can include, for example, a flow-through ceramic or metal monolith substrate that can be packaged in a shell or canister having an inlet and an outlet in fluid communication with the exhaust gas conduit 14 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR 26 catalyst composition is generally a porous and high surface area material which can operate efficiently to convert $NO_x$ constituents in the exhaust gas 15 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques.

The SCR catalyst composition can optionally further comprise one or more base metal oxides as promoters to further decrease the $SO_3$ formation and to extend catalyst life. Base metal oxides are particularly suitable for vanadia catalyst SCRs. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 and/or heat to form ammonia. Equations (1)-(5) provide exemplary chemical reactions for $NO_x$ reduction involving ammonia.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are merely illustrative, and are not meant to confine the SCR 26 to a particular $NO_x$ reduction mechanism or mechanisms, nor preclude the operation of other mechanisms. The SCR 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR 26. Non-ammonia reductants can be used as a full or partial alternative to ammonia as desired. In implementations where the reductant 36 includes urea, the urea reacts with the exhaust to produce ammonia, and ammonia is supplied to the SCR 26. Reaction (6) below provides an exemplary chemical reaction of ammonia production via urea decomposition.

$$CO(NH_2)_2 + H_2O \rightarrow 2NH_3 + CO_2 \quad (6)$$

It should be appreciated that Equation (6) is merely illustrative, and is not meant to confine the urea or other reductant 36 decomposition to a particular single mechanism, nor preclude the operation of other mechanisms.

The SCR 26 can store (i.e., absorb, and/or adsorb) reductant for interaction with exhaust gas 15. For example, the reductant can be stored within the SCR as ammonia. A given SCR has a reductant capacity, or an amount of reductant or reductant derivative it is capable of storing. The amount of reductant stored within a SCR relative to the SCR capacity can be referred to as the SCR "reductant loading", and can be indicated as a % loading (e.g., 90% reductant loading) in some instances. During operation of SCR 26, injected reductant 36 as stored in the SCR and consumed during reduction reactions with NOx species and must be continually replenished. Determining the precise amount of reductant 36 to inject is critical to maintaining exhaust gas 15 emissions at acceptable levels; insufficient reductant levels with the system 10 (e.g., within SCR 26) can result in undesirable NOx species emissions ("NOx breakthrough") from the system (e.g., via a vehicle tailpipe), while excessive reductant 36 injection can result in undesirable amounts of reductant 36 passing through the SCR 26 unreacted or exits the SCR as an undesired reaction product ("reductant slip"). Reductant slip and NOx breakthrough can also occur when the SCR is below a "light-off" temperature, where the device is not catalytically active or efficient, and/or does not function as desired. For example, many SCR $NO_x$ reduction catalysts can have light-off temperatures of about 150° C. to about 200° C. SCR 26 dosing logic can be utilized to command reductant 36 dosing, and adaptations thereof, and can be implemented by module 50, for example.

A reductant 36 injection dosing rate (e.g., grams per second) is commonly determined by comparing the $NO_x$ concentration upstream of a SCR 26 (e.g., measured with upstream $NO_x$ sensor 60) with the $NO_x$ concentration downstream of a SCR 26 (e.g., measured with downstream $NO_x$ sensor 62) to determine an actual $NO_x$ conversion rate and comparing the actual NOx conversion rate to a desired conversion rate. A desired reductant 36 dosing rate can be continuously determined by the control module 50 using the comparison between the upstream NOx concentration and the downstream NOx concentration, and the actual reductant 36 dosing rate can be adapted by increasing or decreasing the dosing rate. For example, the reductant 36 dosing rate can be adapted to achieve a desired $NO_x$ concentration or flow rate in exhaust gas 15 downstream of SCR 26, or achieve a desired SCR 26 $NO_x$ conversion rate. A desired conversion rate can be determined by many factors, such as the characteristics of SCR 26 (e.g., catalyst type) and/or operating conditions of the system (e.g., ICE 12 operating parameters).

Under certain operating conditions, it has been discovered that reductant-derived species can poison the one or more SCR 26 catalytic compositions and retard or prevent reduction of $NO_x$ species. In particular, SCR-poisoning species can include ammonia nitrates and ammonia nitrites (hereafter individually or collectively referred to as "AN compositions"), which form and/or accumulate proximate the SCR 26 catalytic compositions, and chemically inhibit the catalytic activity of the SCR 26 catalytic composition and/or physically retard contact between exhaust gas 15 and the SCR 26 catalytic composition. AN compositions can form and/or accumulate under particular temperature and $NO_x$ concentration conditions, wherein NOx concentration condition of interest is the ratio of $NO_2$ to total $NO_x$ entering the SCR 26 (the "$NO_2$:$NO_x$ ratio"). A higher $NO_2$:$NO_x$ ratio increases the potential for AN composition poisoning, at requisite temperatures, and can further be exacerbated by OC 20 which is configured to increase the $NO_2$:$NO_x$ ratio of exhaust gas 15 communicated to SCR 26. For example, under normal ICE 12 operating conditions (e.g., OC temperature of about 200° C. to about 250° C.) and with optimal OC 20 performance, an OC 20 can discharge an exhaust gas 15 with up to about a 0.8 $NO_2$:$NO_x$ ratio. Freshly commissioned OCs often exhibit high $NO_2$ yields and similarly can exacerbate SCR 26 catalyst poisoning.

In a specific example, AN compositions can form and/or accumulate on SCR 26 catalytic compositions comprising copper, iron, copper impregnated zeolite or iron impregnated zeolite, when the temperature of SCR 26 and/or exhaust gas is less than about 300° C., less than about 275° C., less than about 250° C., less than about 225° C., or less than about 200° C., and the $NO_2$:$NO_x$ ratio of the exhaust gas 15 entering the SCR device is at least about 0.45, at least about 0.475, or at least about 0.5. This observation is particularly noteworthy in that SCR 26 catalyst poisoning can occur above the catalyst light-off temperature (e.g., about 150° C. to about 200° C.). Moreover, SCR 26 catalyst poisoning is not isolated to vehicle cold-starts, and can occur during normal vehicle operation under some conditions (e.g., light engine load, high way driving).

Provided herein are methods for detecting catalyst poisoning of SCR catalytic compositions, and methods for controlling SCRs to prevent, minimize, mitigate, and/or rectify catalyst poisoning. The methods will be described in reference to system 10, but are not to be construed as limited by the particular configuration of system 10 as described. Methods can be advantageously utilized during ICE 12 cold starts and during normal operation of a vehicle incorporating ICE 12, among other instances.

Figure 2:
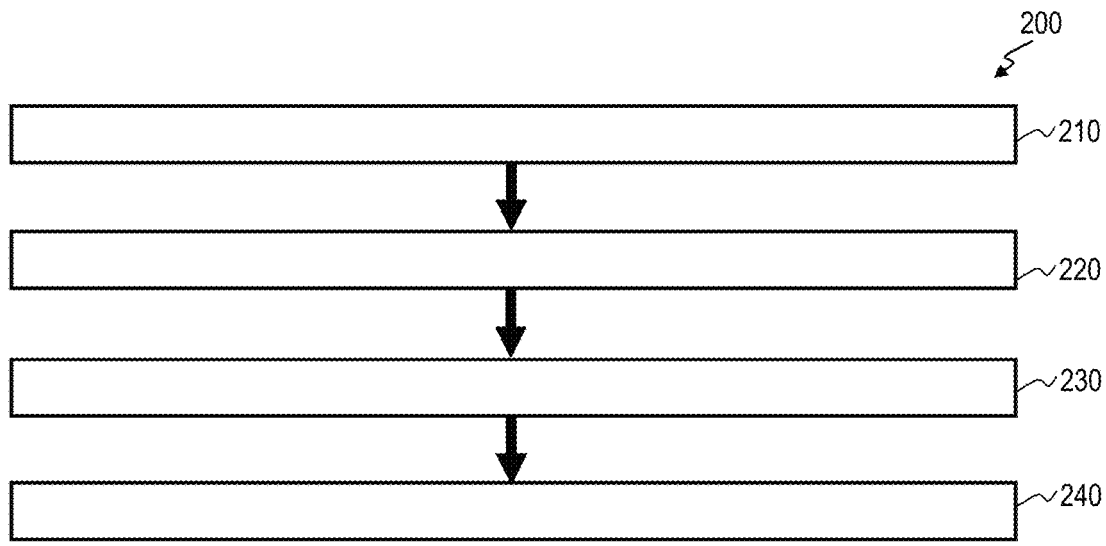
FIG. 2 illustrates a flow chart of a method for detecting catalyst poisoning of a selective catalytic reduction device, according to one or more embodiments.

FIG. 2 illustrates a method 200 for detecting catalyst poisoning of a SCR 26 of an exhaust gas treatment system 10, comprising detecting 220 a SCR 26 inlet exhaust gas $NO_2$:$NO_x$ ratio above a poisoning NOx flux threshold, detecting 230 a SCR 26 temperature below a poisoning temperature threshold, and determining 240 SCR 26 catalyst poisoning. $NO_x$ includes all nitrogen oxide species present within the exhaust gas at the SCR 26 inlet. In a specific embodiment, $NO_x$ comprises the total of NO and $NO_2$ present within the exhaust gas at the SCR 26 inlet. The $NO_2$:$NO_x$ ratio poisoning $NO_x$ flux threshold can comprise about 0.45, about 0.475, about 0.5, or about 0.525. In a specific embodiment the $NO_2$:$NO_x$ ratio poisoning NOx flux threshold comprises 0.5. The poisoning temperature threshold can be empirically or theoretically determined for a particular catalyst composition. For example, for a catalyst including copper, iron, copper impregnated zeolite or iron impregnated zeolite, the poisoning temperature threshold can comprise about 300° C., about 275° C., about 250° C., about 225° C., or about 200° C. In a specific embodiment, the poisoning temperature threshold for a catalyst including copper zeolite or iron zeolite comprises about 275° C. The poisoning temperature threshold can be measured by one or more of upstream temperature sensor 52 and downstream temperature sensor 54, for example. Poisoning comprises the formation and/or accumulation of one or more AN compositions proximate the SCR 26 catalytic composition.

Determining 240 SCR 26 catalyst poisoning can comprise one or more of measuring an amount of accumulated AN composition deposit proximate the SCR catalyst, and measuring a decreased reduction yield of $NO_x$ species by the SCR catalyst. Measuring an amount of accumulated ammonium nitrites and/or ammonium nitrates deposit proximate the SCR catalyst can be accomplished using sensors, or an accumulation model, for example. Unsuitable levels of AN composition accumulated proximate a SCR 26 catalyst will vary based on the SCR catalyst type, application etc. In a non-limiting example, about 1 gram to about 3 grams of AN composition accumulation can be considered an unsuitable level of poisoning for a SCR 26 having a catalyst composition volume of about 1 L to about 5 L. Because reductant must be present proximate the SCR 26 catalyst in order for AN composition poisoning to occur, method 200 can optionally further include determining 210 a minimum SCR 26 reductant loading prior to determining 240 SCR 26 catalyst poisoning. Determining 210 a minimum SCR 26 reductant loading can include determining recent reductant 36 dosing quantities, in some embodiments. In a specific example, a minimum reductant loading can comprise a 5% SCR loading, for example. Determining 210 a minimum SCR 26 reductant loading can ensure a sufficient amount of reductant or reductant-derived species (e.g., $NH_4^+$, $NH_3$) are present to enable catalyst poisoning, and thereby false poisoning determinations can be avoided.

Figure 3:
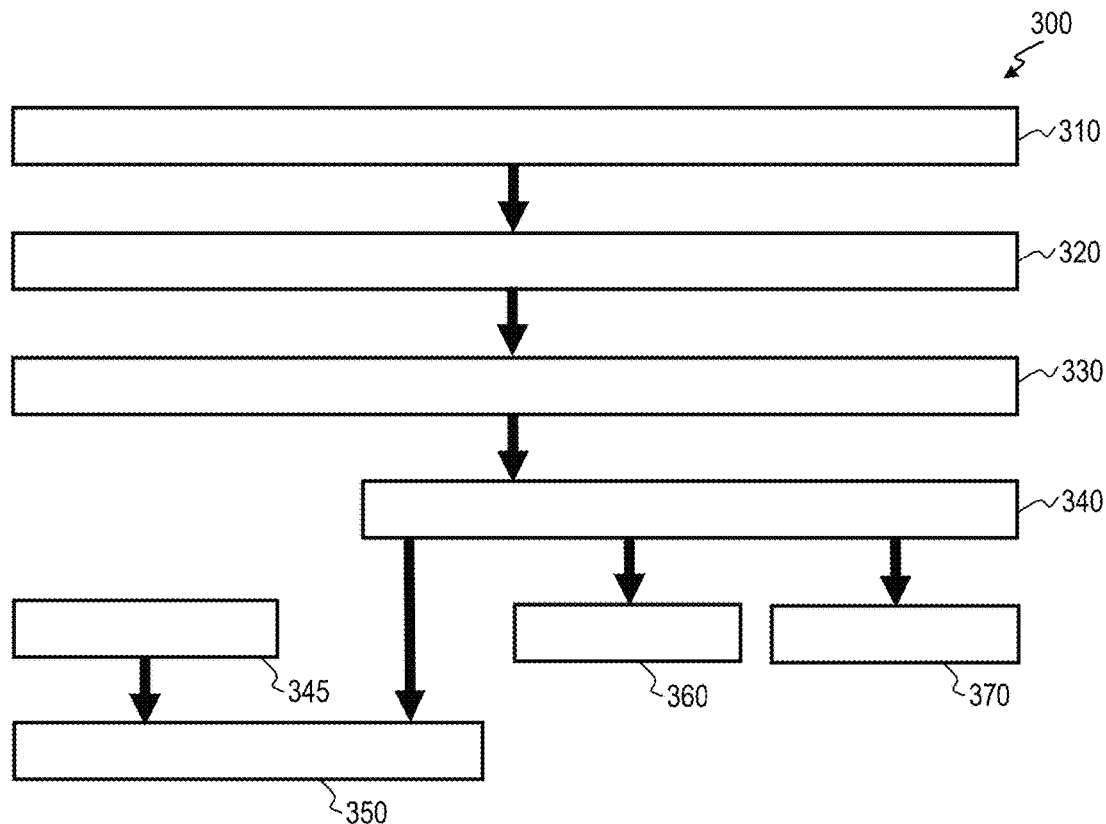
FIG. 3 illustrates a flow chart of a method for controlling an exhaust gas treatment system, according to one or more embodiments.

FIG. 3 illustrates a method for controlling an exhaust gas treatment system 10, comprising detecting 320 a SCR 26 inlet exhaust gas $NO_2:NO_x$ ratio above a poisoning NOx flux threshold, detecting 330 a SCR 26 temperature below a poisoning temperature threshold, determining 340 SCR 26 catalyst poisoning, and performing 350 a catalyst cleaning strategy. $NO_x$ includes all nitrogen oxide species present within the exhaust gas at the SCR 26 inlet. In a specific embodiment, $NO_x$ comprises the total of NO and $NO_2$ present within the exhaust gas at the SCR 26 inlet. The $NO_2:NO_x$ ratio poisoning NOx flux threshold can comprise about 0.45, about 0.475, about 0.5, or about 0.525. In a specific embodiment the $NO_2:NO_x$ ratio poisoning NOx flux threshold comprises 0.5. The $NO_2:NO_x$ ratio of the exhaust gas 15 can be measured by upstream $NO_x$ sensor 60, for example. The poisoning temperature threshold can comprise about 300° C., about 275° C., about 250° C., about 225° C., or about 200° C. In a specific embodiment, the poisoning temperature threshold for a catalyst including copper zeolite or iron zeolite comprises about 275° C. The poisoning temperature threshold can be measured by one or more of upstream temperature sensor 52 and downstream temperature sensor 54, for example. Poisoning comprises the formation and/or accumulation of one or more AN compositions proximate the SCR 26 catalytic composition.

Method 300 can optionally further include determining 310 a minimum SCR 26 reductant loading prior to determining 340 SCR 26 catalyst poisoning. A minimum reductant loading can comprise a 5% SCR loading, for example. Method 300 can further optionally comprise arresting 360 reductant dosing subsequent to determining 340 SCR 26 catalyst poisoning. While a SCR catalyst is poisoned, $NO_x$ reduction is partially or entirely retarded, and further reductant 36 dosing will detrimentally serve to exacerbate reductant slip and/or SCR 26 catalyst poisoning. After arresting 360 reductant 36 dosing, reductant dosing can be reinitiated once one or more of a catalyst poisoning is reduced to an acceptable level, the SCR 26 temperature rises above the poisoning temperature threshold, or the SCR 26 inlet exhaust gas $NO_2:NO_x$ ratio falls below the poisoning NOx flux threshold.

Performing 350 a catalyst cleaning strategy can generally comprises heating the SCR 26 catalyst composition to a temperature above the poisoning temperature threshold in order to decompose the one or more AN compositions or otherwise physically extricate the AN compositions from the SCR 26 catalyst composition proximity. Without being held to a single decomposition or other chemical mechanism for AN composition cleaning, high temperature heating can generally break down one or more AN compositions into $NH_3$, $NO_x$, $N_2$, and various oxygen-free nitrogen compounds, among others. AN compositions are more readily decomposed and/or physically extricated from the SCR 26 catalyst composition proximity at increasing temperatures. Accordingly, in some embodiments, performing 350 a catalyst cleaning strategy can comprise heating the SCR 26 catalyst composition to at least about 350° C., at least about 450° C., at least about 550° C., or at least about 600° C. for a duration of time. In general, a shorter duration of time is required at higher heating temperatures, and the duration of time required to suitably clean the SCR 26 catalyst composition can depending on one or more of the amount of AN composition accumulation, the type of SCR 26 catalyst composition, and the SCR 26 size, among others.

In some embodiments, performing 350 a catalyst cleaning strategy can comprise utilizing a heater, such as an optional electrically heated catalyst device (EHC) (not shown) appurtenant to SCR 26. Optional EHC can be disposed within SCR 26 or upstream from SCR 26 in close proximity thereto, for example, and include a monolith and an electric heater. The electric heater can be connected to and powered by an electrical source, and can be selectively activated to heat the monolith. Optional EHC can be constructed of any suitable material that is electrically conductive such as the wound or stacked metal monolith, for example. In some embodiments, the EHC monolith is incorporated into the SCR 26 substrate and/or canister, and can have a catalyst composition applied thereto. EHC can be selectively controlled by module 50, for example.

In some embodiments, performing 350 catalyst cleaning strategy can comprise heating exhaust gas 15 such as by adjusting engine calibration parameters to implement a post-injection strategy, adjusting engine calibration parameters to implement an after-injection strategy, or implementing an auxiliary injection strategy. One or more such injection strategies can be used as alternatives to or in addition with an EHC cleaning strategy. One or multiple exhaust gas 15 heating strategies can be implemented and/or optimized by module 50, for example. It should be appreciated that the exhaust gas 15 heating strategies identified above are merely illustrative, and are not meant to preclude the use or suitability of other additional or alternative exhaust gas 15 heating techniques.

A post-injection strategy is a modification of a normal ICE injection strategy, by adding or replacing a fuel injection event. During the operation of an ICE, such as ICE 12, fuel and air are injected into a cylinder and combusted, reciprocating a piston within the cylinder which subsequently translates mechanic work to an associated crankshaft. During or subsequent to movement of the piston via the combustion event, the combustion products are expelled from the cylinder as exhaust. A post-injection strategy comprises injecting fuel into an engine cylinder after the first air-fuel mixture is introduced into the cylinder, but such that the post-injected fuel is substantially or completely combusted within the cylinder. By introducing additional fuel into the cylinder, post-injection accordingly imparts additional heat to the exhaust gas expelled from the cylinder which subsequently can aid in cleaning SCR 26. A post-injection strategy can be implemented for a duration of time, such as until AN compositions are suitably decomposed or otherwise physically extricated from the SCR 26 catalyst composition proximity, or until a more preferred cleaning strategy is implemented, for example. The amount of post-injection fuel utilized and/or the duration a post-injection strategy is implemented can be correlated to the amount of AN composition accumulation proximate the SCR 26 catalyst composition.

An after-injection strategy is a modification of a normal ICE injection strategy, by adding or replacing a fuel injection event. An after-injection strategy introduces fuel into an engine cylinder after the initial air-fuel mixture is introduced into the cylinder and generally while the cylinder exhaust valve is open or just before the exhaust valve opens. More specifically, after-injection occurs after the first air-fuel mixture has already combusted such that the after-injected fuel does not combust within the cylinder. The after-injected fuel is expelled unburnt from the cylinder during the exhaust stroke and introduced to the exhaust gas system, subsequently contacting OC 20 or a like catalytic component. The fuel combusts and/or reacts with OC 20 or the like catalytic component and heat released during oxidation of the fuel is imparted to the exhaust gas treatment system 10. An after-injection strategy can be implemented for a duration of time, such as until AN compositions are suitably decomposed or otherwise physically extricated from the SCR 26 catalyst composition proximity, or until a more preferred cleaning strategy is implemented, for example. The amount of after-injection fuel utilized and/or the duration an after-injection strategy is implemented can be correlated to the amount of AN composition accumulation proximate the SCR 26 catalyst composition.

Similarly, an auxiliary injection strategy effects contact between unburnt fuel and OC 20 or like catalytic device to impart heat to exhaust gas treatment system 10. Generally, auxiliary injection comprises introducing fuel or hydrocarbons to the exhaust gas system 10 upstream from OC 20 or a like catalytic component, but downstream from a cylinder of ICE 12. In some embodiments, fuel or hydrocarbons are introduced to directly to OC 20. In post-injection, after-injection, and auxiliary injection strategies, the fuel can be injected by an auxiliary fuel injector (not shown), for example.

During operation of exhaust gas treatment system 10, one or more various devices may require high temperature regeneration, such as by the cleaning methods described above. For example, over time PF 30 can accumulate particulate matter and must be regenerated via high temperature heating in order to oxidize or burn the accumulated particulate matter. In general, a PF 30 regeneration can require a significantly higher temperature than AN composition cleaning. Accordingly, method 300 can further comprise identifying 345 a cooperative regeneration opportunity prior to performing 350 a catalyst cleaning strategy. Identifying 345 a cooperative regeneration opportunity can include determining if one or more additional exhaust gas treatment system 10 devices require regeneration, and implementing a common regeneration/cleaning technique. For example, if PF 30 requires regeneration and SCR 26 catalyst poisoning has been determined 340, an after-injection strategy can be implemented to satisfy both demands.

In some embodiments, method 300 can further include inhibiting 370 OC 20 performance subsequent to determining 340 SCR 26 catalyst poisoning in order to reduce the $NO_2:NO_x$ ratio of SCR 26 feed gas. Inhibiting 370 OC 20 performance can comprise delaying or foregoing OC 20 heating strategies designed to achieve an OC 20 light-off temperature. In some embodiments, inhibiting 370 OC 20 performance can comprise implementing a rich-burn ICE 12 strategy, wherein the air:fuel ratio is reduced below the stoichiometric level. A rich-burn strategy can inhibit 370 OC 20 performance by producing a lower temperature exhaust, thus delaying heating of the OC 20. Concurrently, SCR 26 can be heated by an EHC, for example. A rich-burn strategy further produces exhaust gas 15 having higher concentrations of uncombusted hydrocarbons and CO. Oxidation of uncombusted hydrocarbons and CO within in OC 20 competes with $NO_x$ oxidation (i.e., $NO_2$) production, and therefore reduces the $NO_2:NO_x$ ratio of SCR 26 feed gas.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an exhaust gas treatment system, including a selective catalytic reduction device (SCR) configured to receive exhaust gas supplied by an internal combustion engine (ICE) and reductant, a NOx sensor in fluid communication with the exhaust gas upstream from the SCR, at least one temperature sensor configured to determine the temperature of the SCR, and a control module operably connected to the NOx sensor and the at least one temperature sensor, the method comprising:

detecting, via the NOx sensor, a SCR inlet exhaust gas $NO_2:NO_x$ ratio above a poisoning NOx flux threshold;

detecting, via the at least one temperature sensor, a SCR temperature below a poisoning temperature threshold;

detecting, via the control module, SCR catalyst poisoning, wherein SCR catalyst poisoning comprises one or more ammonium nitrites and ammonium nitrates forming and/or accumulating proximate the SCR catalytic composition; and performing a SCR catalyst cleaning strategy in response to detecting SCR catalyst poisoning, wherein the SCR cleaning strategy comprises heating the SCR catalyst composition to a temperature above the poisoning temperature threshold.

2. The method of claim 1, wherein determining SCR catalyst poisoning comprises one or more of measuring an amount of accumulated ammonium nitrites and/or ammonium nitrates deposit proximate the SCR catalyst, and measuring a decreased reduction yield of $NO_x$ species by the SCR catalyst.

3. The method of claim 1, wherein the poisoning flux threshold comprises a $NO_2:NO_x$ ratio of about 0.45.

4. The method of claim 1, wherein the SCR catalytic composition comprises one or more of copper and iron.

5. The method of claim 4, wherein the poisoning temperature threshold comprises about 275° C.

6. The method of claim 1, further comprising determining a minimum SCR reductant loading prior to determining SCR catalyst poisoning.

7. The method of claim 1, further comprising arresting reductant dosing subsequent to determining SCR catalyst poisoning.

8. The method of claim 1, wherein the exhaust gas treatment system further comprises an oxidation catalyst device disposed upstream from the SCR, and the method further comprises comprising inhibiting the oxidation catalyst device performance subsequent to determining SCR catalyst poisoning.

9. The method of 8, wherein inhibiting oxidation catalyst performance includes implementing an ICE rich burn strategy.

10. The method of claim 1, wherein the cleaning strategy comprises one or more of utilizing an electric heater device disposed proximate the SCR catalyst composition, adjusting ICE calibration parameters to implement a post-injection strategy, adjusting ICE calibration parameters to implement an after-injection strategy, or implementing an auxiliary injection strategy.

11. The method of claim 1, further comprising identifying a cooperative regeneration opportunity prior to performing a SCR catalyst cleaning strategy.

12. The method of claim 11, wherein the exhaust gas treatment system further includes a particulate filter device, and the SCR catalyst cleaning strategy comprises a particulate filter device regeneration.

* * * * *